Aug. 7, 1928.
W. S. STOCKTON
1,680,182
DETACHABLE HANDLE FOR RECEPTACLES
Filed June 26, 1926
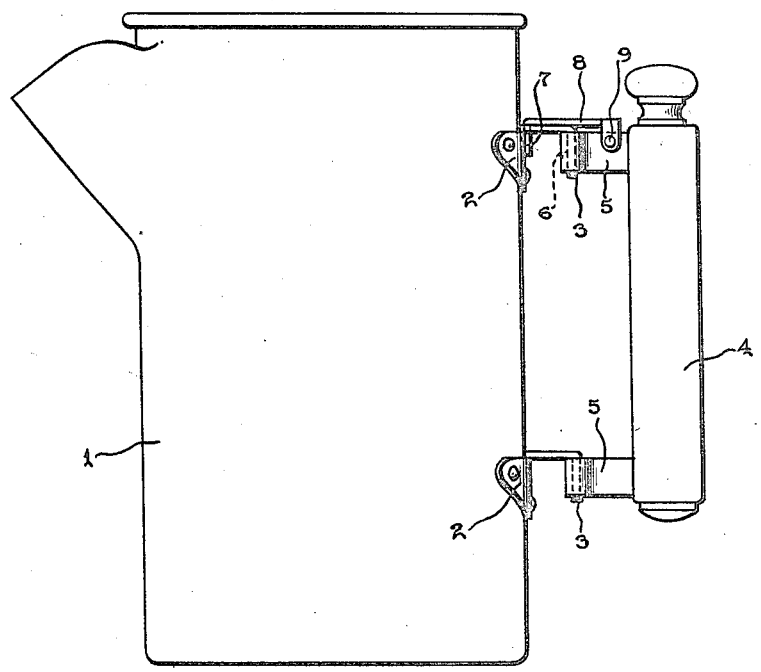
Fig. 1.
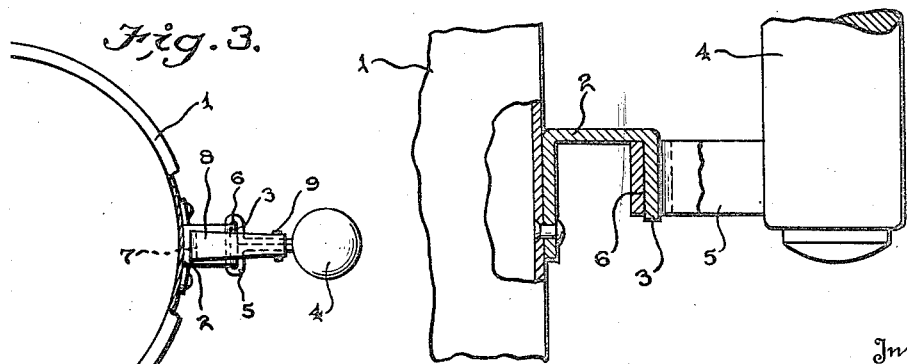
Fig. 2.
Fig. 3.
Inventor
William S. Stockton
Attorney Patented Aug. 7, 1928.

1,680,182

UNITED STATES PATENT OFFICE.

WILLIAM S. STOCKTON, OF ROANOKE, VIRGINIA.

DETACHABLE HANDLE FOR RECEPTACLES.

Application filed June 26, 1926. Serial No. 118,708.

Coffeepots usually outlast their handles due to the handles being for the most part made of wood. In other words, the wood, due to the constant heat when making coffee, becomes charred, then weakened and eventually breaks, necessitating the buying of a new coffeepot.

With these facts in view, the present invention has for its purpose to provide a detachable handle which may be disconnected from the coffeepot while boiling coffee and when the coffee is made, the handle may again be attached, allowing the pot to be removed from the stove to the table where it may be used without fear of the handle breaking or becoming detached.

Another purpose is to provide means for holding the handle rigid while attached to the receptacle, as well as preventing the handle from dropping downwardly.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in side elevation of a conventional form of coffeepot, showing the improved handle attaching means constructed in accordance with the invention.

Figure 2 is an enlarged detail vertical sectional view of one of the connections between the handle and the wall of the coffeepot or other receptacle.

Figure 3 is a plan view of Figure 2, showing the means for retaining the handle rigid and also preventing it detaching.

Referring to the drawings, 1 designates a coffeepot or other receptacle, the wall of which is provided with brackets 2 having arms 3 which extend downwardly, paralleling the wall of the receptacle and 4 denotes a detachable handle which is provided with lugs 5. The lugs 5 have sockets 6 for the reception of the downwardly extending arms 3 of the brackets 2.

The handle is engaged with the receptacle by an upward movement causing the sockets 6 to slide over the arms 3 and when such connection is made the latch member 8 is engaged to retain the handle in connected position. The latch member is provided with a terminal downwardly deflected extremity 7 insertable through an opening in the upper bracket 2, the latch member being provided with ears 9 straddling the upper lug 5 of the handle to which the ears are pivotally connected. In the attaching position, the latch 8 lies against the upper bracket 2 with the extremity 7 engaged in the slot, so that the handle is held in latched position. Desiring to remove the handle, the latch is elevated, swinging on its pivotal mounting of the upper lug 5 of the handle and when disengaged from the upper bracket 2 and swung into a position substantially paralleling the handle, the socket member 6 may be lowered from engagement with the arms 3.

The invention having been set forth, what is claimed is:

A receptacle having spaced brackets provided with pendent terminal arms paralleling the receptacle, and a detachable handle having lugs provided with sockets engageable with said pendent arms upon upward movement of the handle with respect to the receptacle, one of the lugs of the handle being provided with a latch having a pivotal connection with the lug to be swung from a position at an angle with the lug into parallelism with the latter, said latch having a downturned extremity engageable in a slot in the bracket with which the latch-carried lug is connected.

In testimony whereof he affixes his signature.

WILLIAM S. STOCKTON.